United States Patent
Doyon et al.

(10) Patent No.: US 6,823,577 B2
(45) Date of Patent: Nov. 30, 2004

(54) MACHINE AND METHOD FOR FABRICATING STRUCTURAL WOOD COMPONENTS

(75) Inventors: Raymond Doyon, Guadeloupe (CA); Félix Lachance, Saint-Georges (CA); Jean Poulin, Saint-Georges (CA); René Drouin, Saint-Georges (CA); Joé Nadeau, Saint-Georges (CA); Jean-Francois Hudon, Saint-Georges (CA); Jocelyn Larivière, Saint-Georges (CA)

(73) Assignee: Structures DLD Ltée, La Guadeloupe (CA)

( * ) Notice: Subject to any disclaimer, the term of this patent is extended or adjusted under 35 U.S.C. 154(b) by 32 days.

(21) Appl. No.: 10/422,905

(22) Filed: Apr. 25, 2003

(65) Prior Publication Data

US 2004/0211049 A1 Oct. 28, 2004

(51) Int. Cl.$^7$ .......................... B23P 11/00; B25B 27/14
(52) U.S. Cl. .................. 29/525.01; 29/281.1; 29/281.3
(58) Field of Search ............................. 29/525.01, 525, 29/406, 464, 466, 425, 428, 700, 719, 281.1, 281.3; 144/353

(56) References Cited

U.S. PATENT DOCUMENTS 3,813,842 A * 6/1974 Troutner ...................... 52/693

* cited by examiner

Primary Examiner—John C. Hong
(74) Attorney, Agent, or Firm—Ogilvy Renault; Guy J. Houle

(57) ABSTRACT

A machine and a method for fabricating structural wood components, such as joist building components, is described. The machine comprises a component assembling jig for assembling pre-cut wood pieces at predetermined positions corresponding to a structural wood component design. Magnetic elements are adapted to position connector plates at predetermined locations in the machine. The assembled wood pieces of the jig are displaced to a transfer platform where they are clamped with the wood pieces positioned at interconnecting junctions. The transfer platform then displaces the assembled and held wood pieces to a position adjacent magnetic connector plate applicators whereby the plates are secured to the wood pieces at the interconnecting junctions to interconnect the wood pieces together to form an assembled structural component which is then displaced and discharged from the machine.

30 Claims, 9 Drawing Sheets

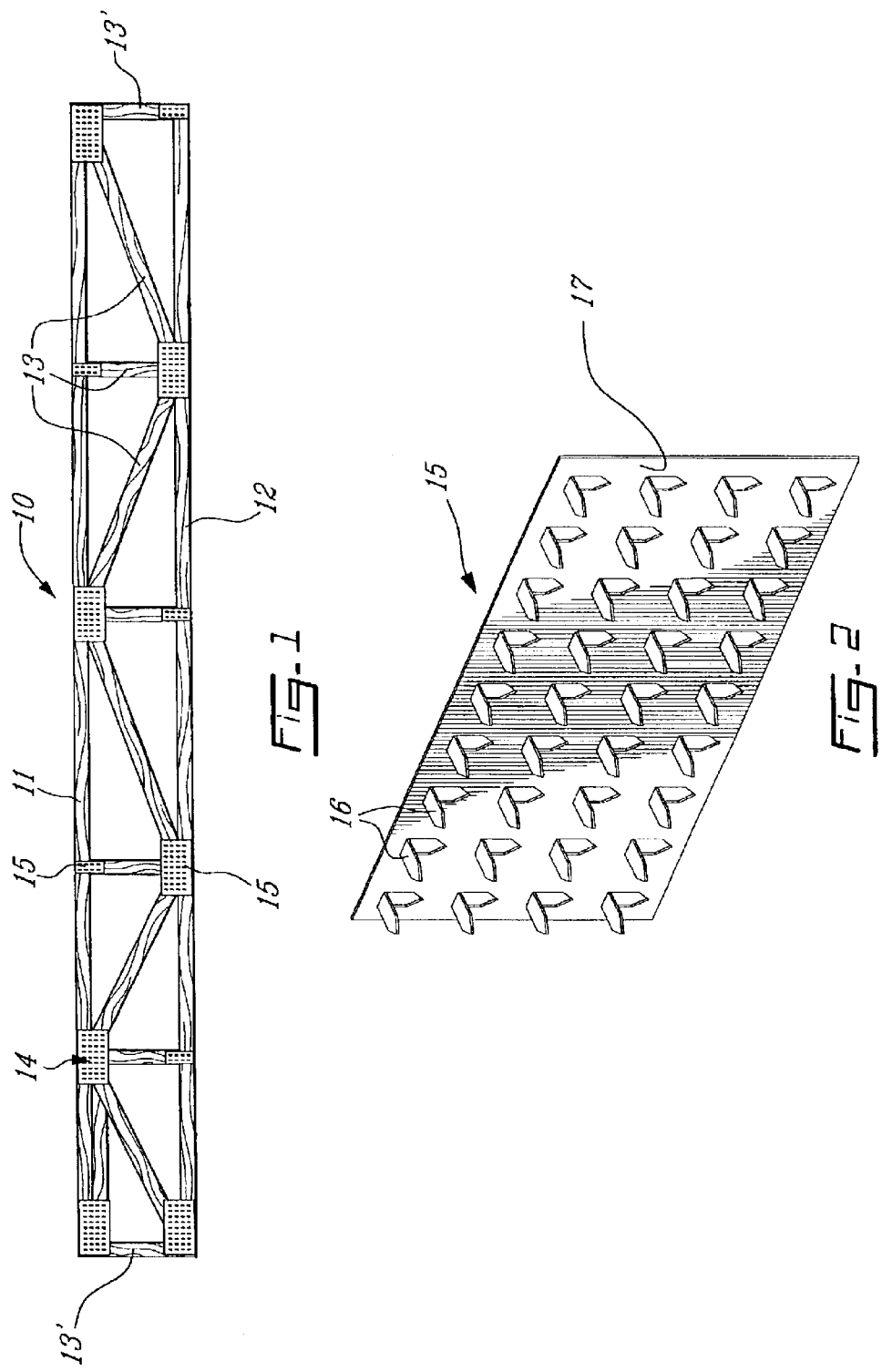

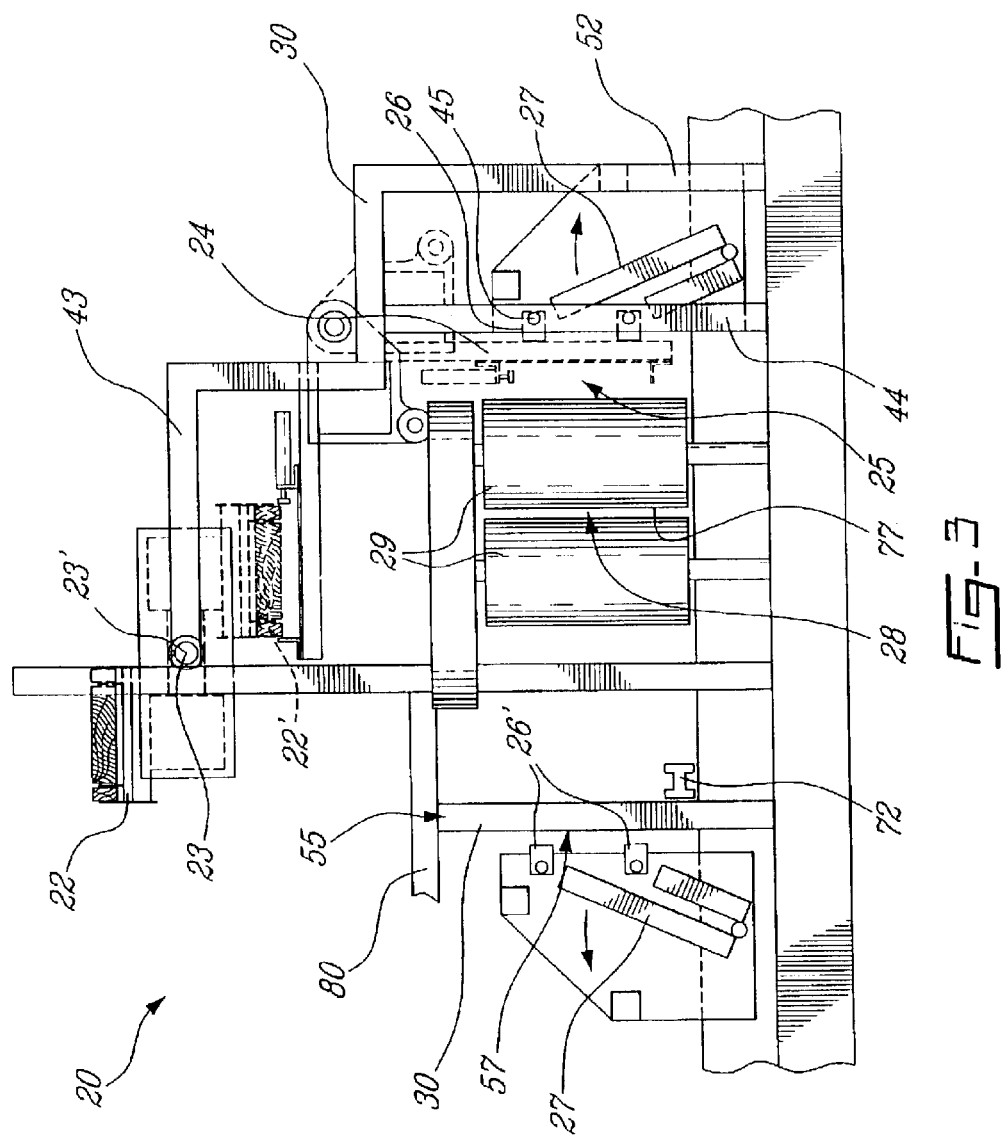

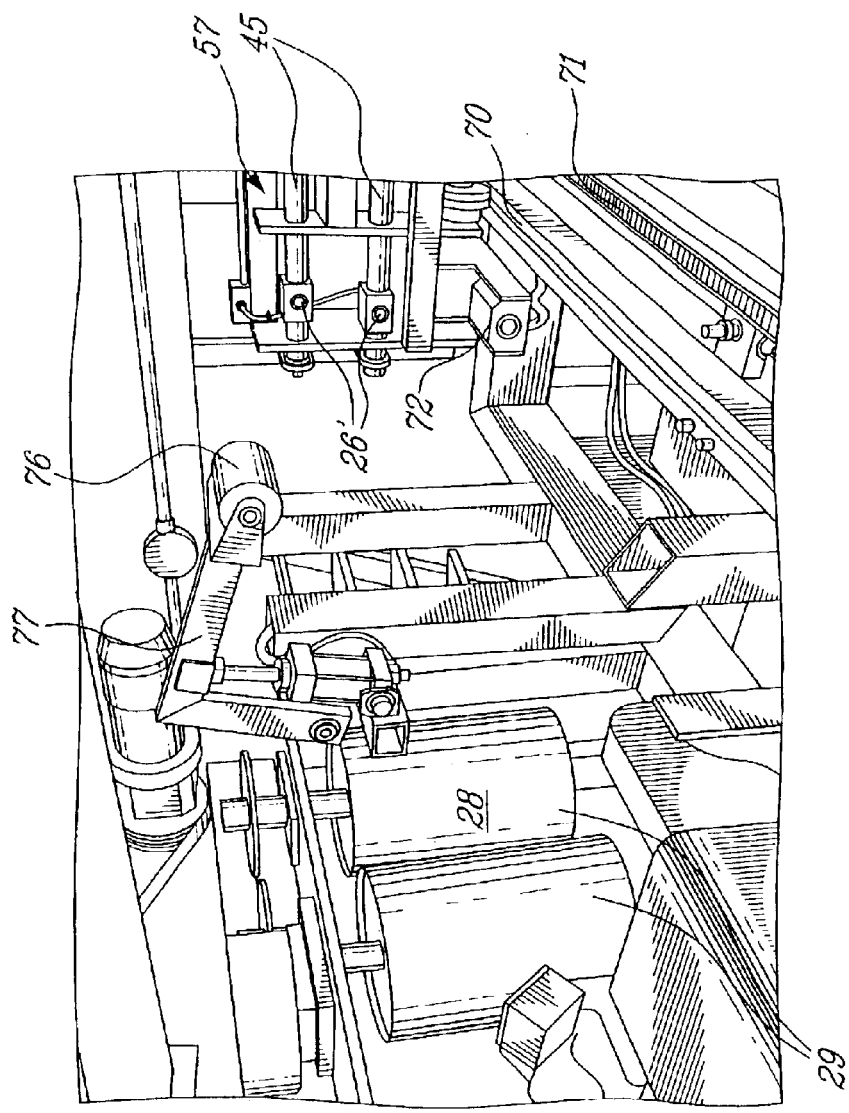

MACHINE AND METHOD FOR FABRICATING STRUCTURAL WOOD COMPONENTS

TECHNICAL FIELD

The present invention relates to a machine and a method for fabricating structural wood components, and more specifically but not exclusively, structural wood joist for use in the construction of building structures.

BACKGROUND ART

It is known in the construction of building structures to substitute solid structural wood components by prefabricated components which comprise a plurality of wood pieces interconnected together to provide load support, at least equivalent to solid wood pieces. These prefabricated components have many advantages, such as easy to maneuver, less costly than equivalent solid wood pieces, less expensive to transport, etc. These prefabricated structural wood components, such as joist components, are fabricated from 2×4 lumber pieces which are disposed in specific configurations and interconnected at their junctures by connecting metal plates which are punched to provide a plurality of wood engaging finger projections extending from one surface thereof. These plates are then pressed into the lumber pieces at their interconnecting junctions. Reference is made to some patents which exemplified this art and namely U.S. Pat. Nos. 3,985,278; 3,769,771; 5,285,720 and 4,241,681.

SUMMARY OF INVENTION

It is a feature of the present invention to provide a novel machine and method for fabricating structural wood components, such as structural joist, for use in the construction of building structures.

According to the above features, from a broad aspect, the present invention provides a machine for fabricating structural wood components. The machine comprises a component assembling jig for assembling pre-cut wood pieces at predetermined positions corresponding to a structural wood component design. Retaining means are provided with the jig to retain wood pieces in position therein. Connector plates are stored in storage means and connector plate positioning means are adapted to position a plurality of connector plates from the storage means, at predetermined locations with respect to the component design and at a fastening location. Each of the connector plates has a plurality of wood engaging finger projections extending from a flat surface thereof. Displacement means is provided for transferring the assembled wood pieces to a clamping transfer platform to hold the assembled wood pieces in contact at interconnecting junctions and transfer the assembled wood pieces to the fastening position with the interconnecting junctions adjacent associated ones of the predetermined locations. Means is provided to secure the connector plates to the wood pieces at the interconnecting junctions to interconnect the wood pieces together to form an assembled structural wood component. Discharge means is provided to discharge the assembled structural wood component.

According to a still further broad aspect of the present invention there is provided a method of fabricating structural wood components and which comprises the steps of disposing pre-cut wood pieces at predetermined positions in a component assembling jig. The pre-cut wood pieces are clamped in the component assembling jig. A plurality of connector plates is positioned at predetermined locations with respect to a wood piece fastening location. The clamped assembled wood pieces are displaced to a transfer position and transferred on a transfer platform by unclamping the wood pieces while maintaining their assembled orientation. The wood pieces are clamped together on the transfer platform and placed in contact at their interconnecting junctions. The transfer platform is displaced to the fastening location with the interconnecting junctions of the wood pieces disposed adjacent associated connector plate positioning means aligned on opposed sides of the structural wood component formed by the assembled wood pieces. The connector plates are then pressed against the assembled wood pieces from opposed side of the interconnecting junction to cause a plurality of wood engaging finger projections of the plates to penetrate into the assembled wood pieces about the interconnecting junctions. The assembled structural wood component is then discharged from the machine.

BRIEF DESCRIPTION OF DRAWINGS

The preferred embodiments of the present invention will now be described with reference to the accompanying drawings in which FIG. 1 is a plan view illustrating a structural wood component, herein a wood joist for the construction of building structures and fabricated by the machine and method of the present invention;

FIG. 2 is a perspective view showing a connector plate which is used for fastening the wood pieces at their interconnecting junctions;

FIG. 3 is a simplified schematic end view showing the basic component assemblies forming the machine of the present invention;

FIG. 12 is a rear perspective view of the pressing roll and the structural wood component discharge drive and guide assembly.

DESCRIPTION OF PREFERRED EMBODIMENTS

Figure 4:
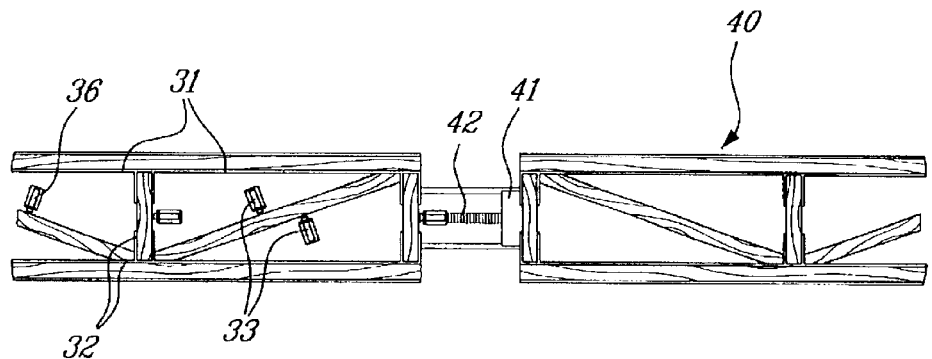
FIG. 4 is a top view of the component assembling jig showing its modular design and adjustability.
Figure 5:
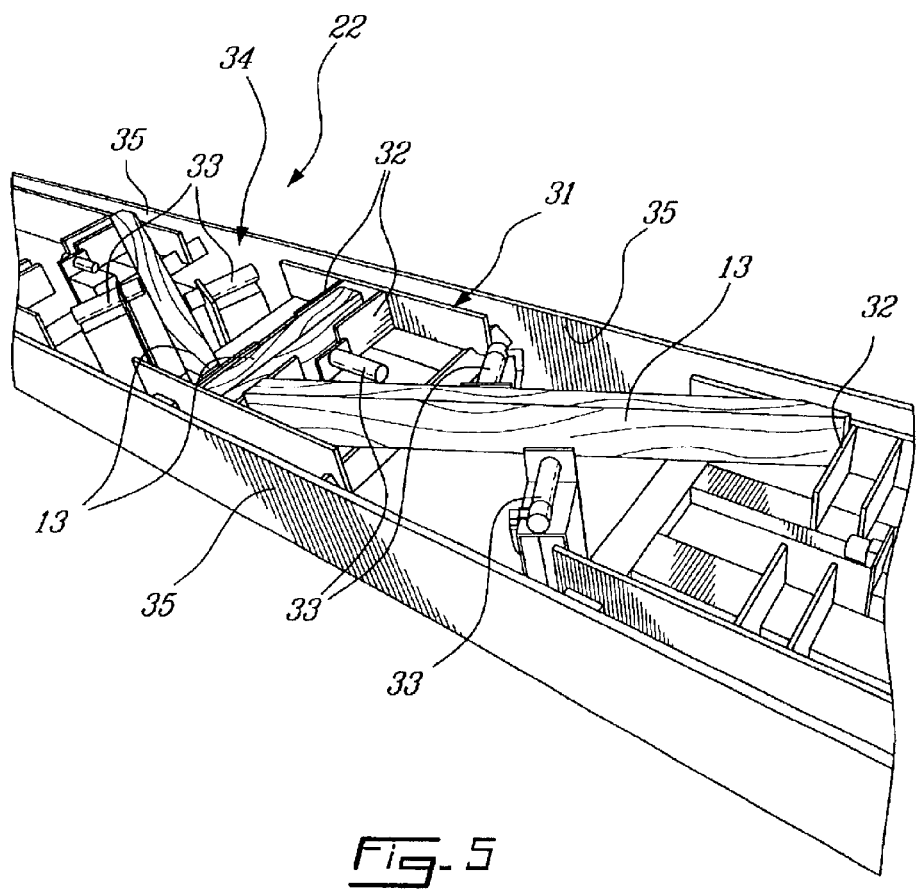
FIG. 5 is a perspective view showing pre-cut wood pieces disposed in the component assembling jig between adjacent orienting modules.

Referring now to the drawings and more particularly to FIGS. 1 and 2, there is shown a structural wood component 10, herein a wood joist, for the fabrication of building structures. These wood joists are well known in the art and usually comprise a pair of elongated horizontal support lumber pieces 11 and 12 which are interconnected by structural load transfer cross-pieces 13 which are interconnected at their interconnecting junctions 14 by connector plates 15. These connector plates are usually rectangular plates, but may have other shapes, and they are formed of metal, usually from a galvanized steel sheet, and the plates are punched to form a plurality of wood engaging finger projections 16 which extend transverse to a flat surface 17 of each of the plates 15.

The present invention relates to a machine and a method for fabricating structural wood components, such as the joist 10 illustrated in FIG. 1.

FIG. 3 is a schematic illustration showing the basic component assemblies of the machine of the present invention. The structural wood component fabricating machine 20 consists essentially of a component assembling jig 21 for assembling the pre-cut wood pieces, such as pieces 11 and 13, at predetermined positions in the jig corresponding to a structural wood component design, such as the joist design illustrated in FIG. 1. As hereinshown the component assembling jig is provided with two modular platforms 22 and 22' which are interconnected together by a pivot connection 23. The platforms 22 and 22' have identical joist designs. One of the modular platform, namely platform 22, is loaded with the wood pieces which are clamped together and moved onto a discharge position as hereinshown by modular platform 22' where the platform is inverted and the assembled pieces are transferred onto a transfer platform 24 where the wood pieces are clamped so that the individual wood pieces 11 and 13 are in contact at their interconnecting junctions ready to receive the connector plates 15. The transfer platform displaces the assembled wood pieces to a fastening location 25 where a plurality of pivotal connector plate transfer members 26 are positioned at predetermined locations with a connector plate 15 ready to be applied at the interconnecting junctions 14. These connector plate transfer members 26 automatically pick up connector plates from magazines 27 at each cycle of the machine. Some of these connector plate transfer members 26' are secured to a carriage frame 57 which is displaceable to and away from the fastening location 25 whereby to clear the fastening location after the plates have been applied to the frame.

The carriage 57 also engages the assembled structural wood component 10 and displaces it to a discharge location 28 where the joist is discharged through driven press rolls 29 which firmly press the connector plates into the structural wood components at their interconnecting junctions while discharging the joist wood component. All of these assemblies are secured to a frame work 30 and details of the assemblies will now be described with reference to other Figures.

With reference now to FIGS. 4 to 7 there will be described the construction and operation of the component assembling jig 21. FIG. 4 is a fragmented top view of the modular platform 22 and as hereinshown it is comprised of removably securable wood piece orienting modules, such as modules 31, for positioning cross pieces 13 at specific orientations. As hereinshown the modules 31 are intermediate modules and these are provided with guide means in the form of guide wall sections or plates 32 formed by welded flanges welded together to receive end sections or side sections of wood pieces. Clamping piston cylinders 33 constitute retaining means to clamp the precut wood pieces 13 in position against the guide wall sections 32 whereby all the wood pieces 11 and 13 are clamped together in the modular platform 22 of the jig. The platform 22 is herein constituted by a U-shaped steel beam 34 which has parallel outer side walls 35 which constitute a guide for the elongated horizontal wood pieces 11 and 12 of the joist and these wood pieces 11 and 12 are also clamped by pistons 36 conveniently located.

Figure 6:
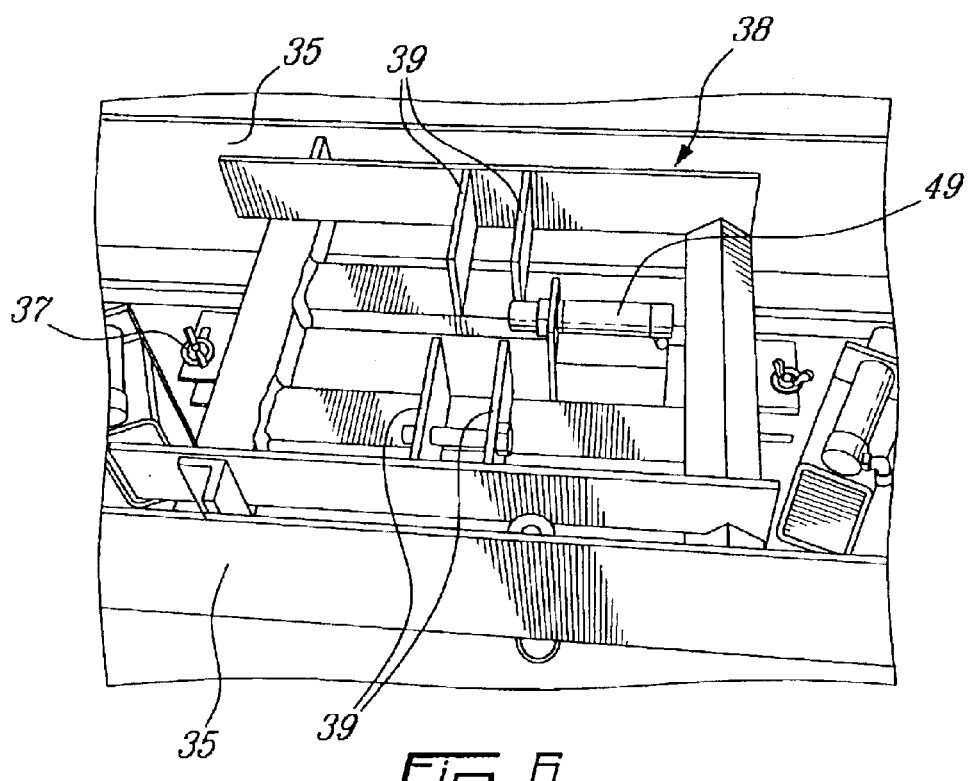
FIG. 6 is a perspective view showing the construction of an end module.

These wood piece orienting modules 31 are interchangeable by fasteners such as fastening bolt 37 illustrated in FIG. 6 which shows the construction of an end one of the module. The end module 38 is positioned at one end of the jig and is also interchangeable if the end section of the joist design is different from the one illustrated in FIG. 6. As shown in FIG. 6 the design comprises a transverse guide channel 39 formed by transverse pairs of parallel steel flanges. A piston 40 clamps a transverse end wood piece 13' in the transverse guide channel 39.

Figure 7:
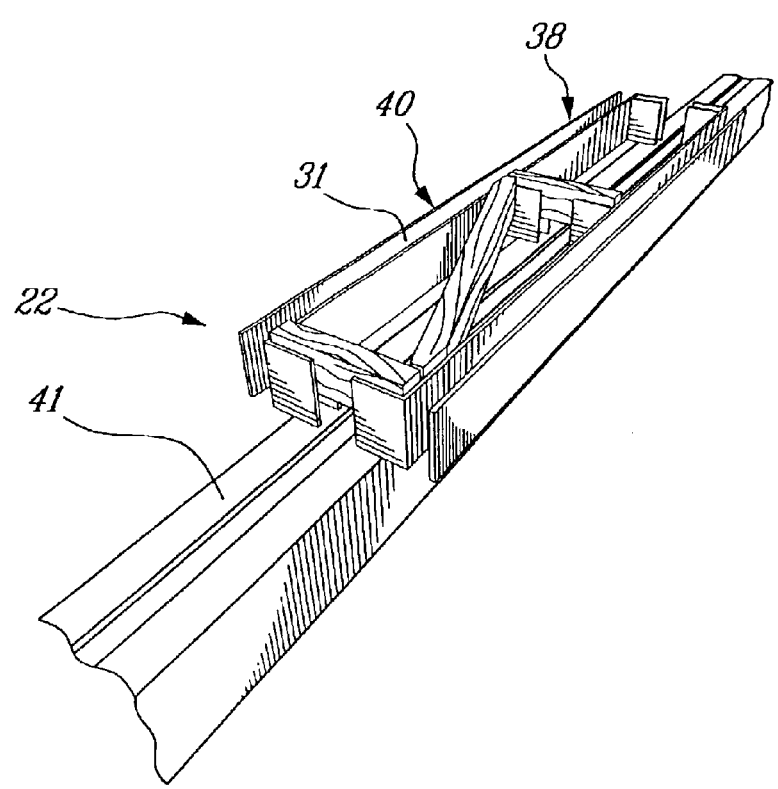
FIG. 7 is a perspective view showing the construction of the component assembling jig.

As shown in FIG. 7 the component assembling jig modular platform 22 has a displaceable slide section 40 which includes at least an end module 38 and which may also include intermediate modules 31 whereby to adjust the length of the joist structural component being assembled. Usually, the stationary portion of the jig is sufficient to assemble a structural component of a certain length and for longer lengths the displaceable slide section accommodates the joist design extension. This displaceable slide section 40 is moveable on a carriage 41 which may be provided by a motor driven screw or by a chain drive and such displacement means are well known in the art.

With reference to FIG. 3 it is pointed out that the modular platform 22 has its open end facing upward at the loading position, as herein illustrated. An operator person loads the modular platform 22 from the top of the machine and once the wood pieces are assembled and clamped the jig 21 is pivoted about its pivot connection 23 to position the modular platform at its inverted discharge position as illustrated by reference numeral 22'. As hereinshown these elongated platforms are disposed in side-by-side and offset parallel relationship. The pivot connection also lies on an elongated axis 23' extending co-extensively with the longitudinal axis of the platforms and disposed therebetween and secured between bridge components 43 of the frame 30.

Figure 8:
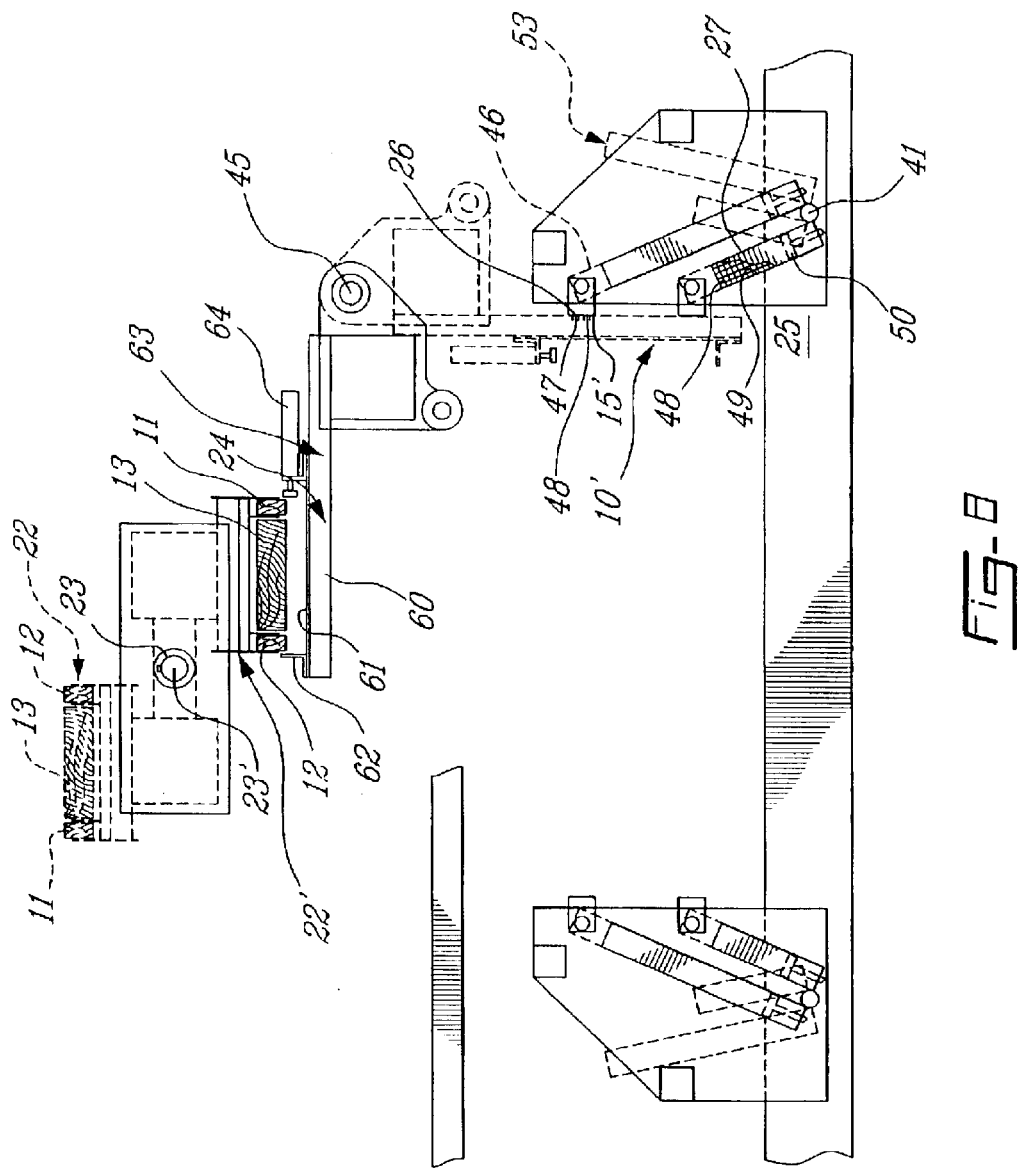
FIG. 8 is an end view showing the construction of the component assembling jig with relation to the transfer plate and the connector plate magnetic transfer members.
Figure 9:
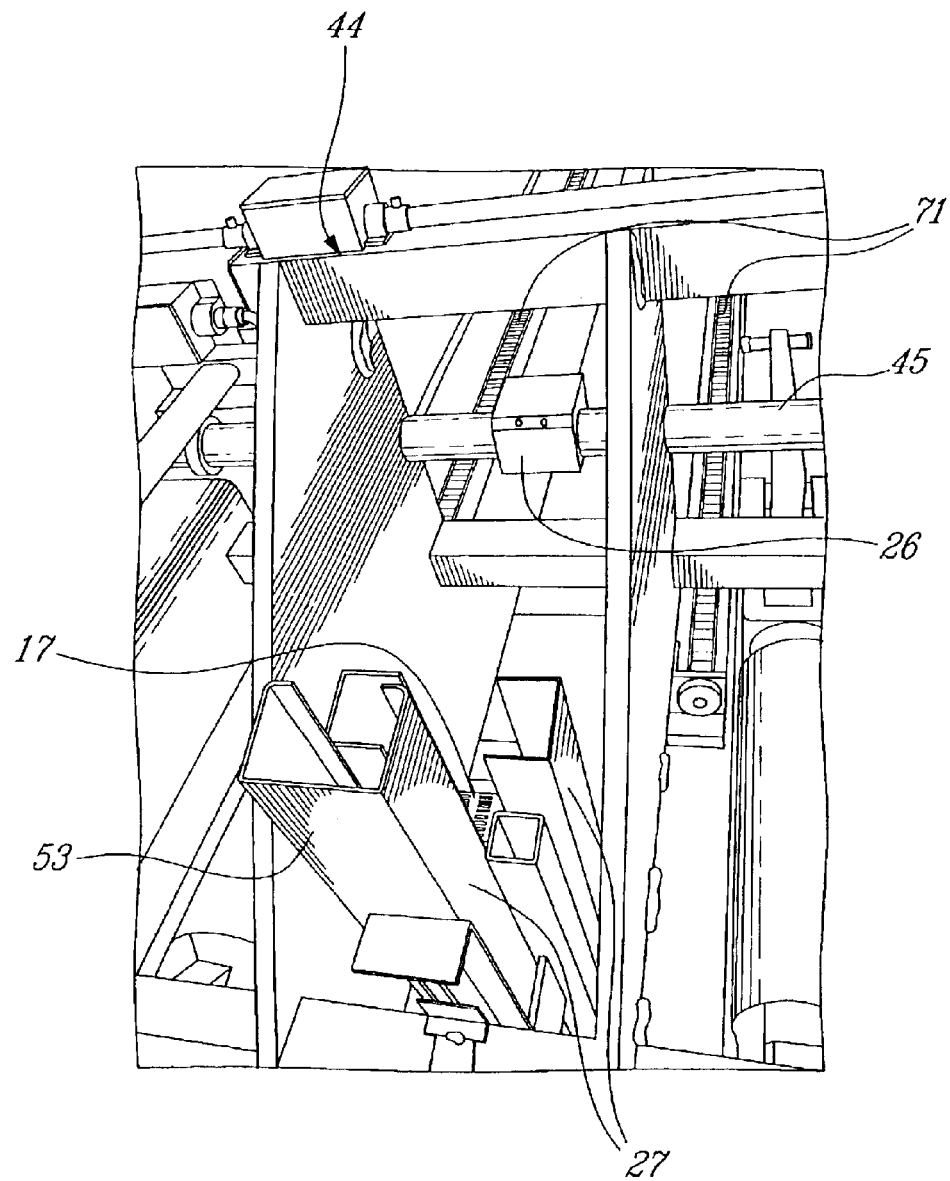
FIG. 9 is a perspective view showing the connector plate magazines at a retracted loading position with respect to the transfer members.

Referring now to FIGS. 8 and 9 there is shown the construction of the connector plate transfer members 26 which constitute connector plate positioning means. As shown in FIG. 3 the frame 30 is provided with vertical stationary frame members 44 and these are provided with a pair of support rods 45 to which are secured connector plate transfer members 26. A plurality of these transfer members is secured at predetermined locations along these support rods and these are pivotally displaced by rotation of the rods from a plate engaging position, as illustrated by phantom lines 46, to a plate engaging position 47 as shown in solid line which positions the plates, such as plate 15' illustrated in FIG. 8, at respective ones of predetermined locations at the fastening location 25 depending on the joist design.

The connector plate transfer members 26 are magnetic members or at least have a magnetic transfer surface 48. The surface 48 magnetically attract a metal connector plate, such as plate 15', from a top end 48 of an associated storage magazine 27 and transfers such plate to the fastening location.

The magazines 27 may have various cross-section shapes to suit the shape of the connector plates and have a guide trough 49 in which a plurality of connector plates 15 are stored in stack form. Pusher means in the form of an index pusher plate 50 is actuated by suitable indexing means to displace the stack in the trough upwardly to the discharge top end 48 to position an uppermost one of the plates adjacent the discharge end 48 to be magnetically engaged by the magnetic transfer surface 48 of the connector plate transfer member 26 when displaced there against. The magnetic force will only pick-up the top plate. The plates are spaced apart by the finger projections 16. The magazines 27 are secured to stationary frame members 52, see FIG. 3, adjacent the fastening location 25 and these magazines are displaceable to a loading position 53 to load plates in the magazines once the magazines are emptied after a predetermined number of joists have been constructed by the machine.

Figure 10:
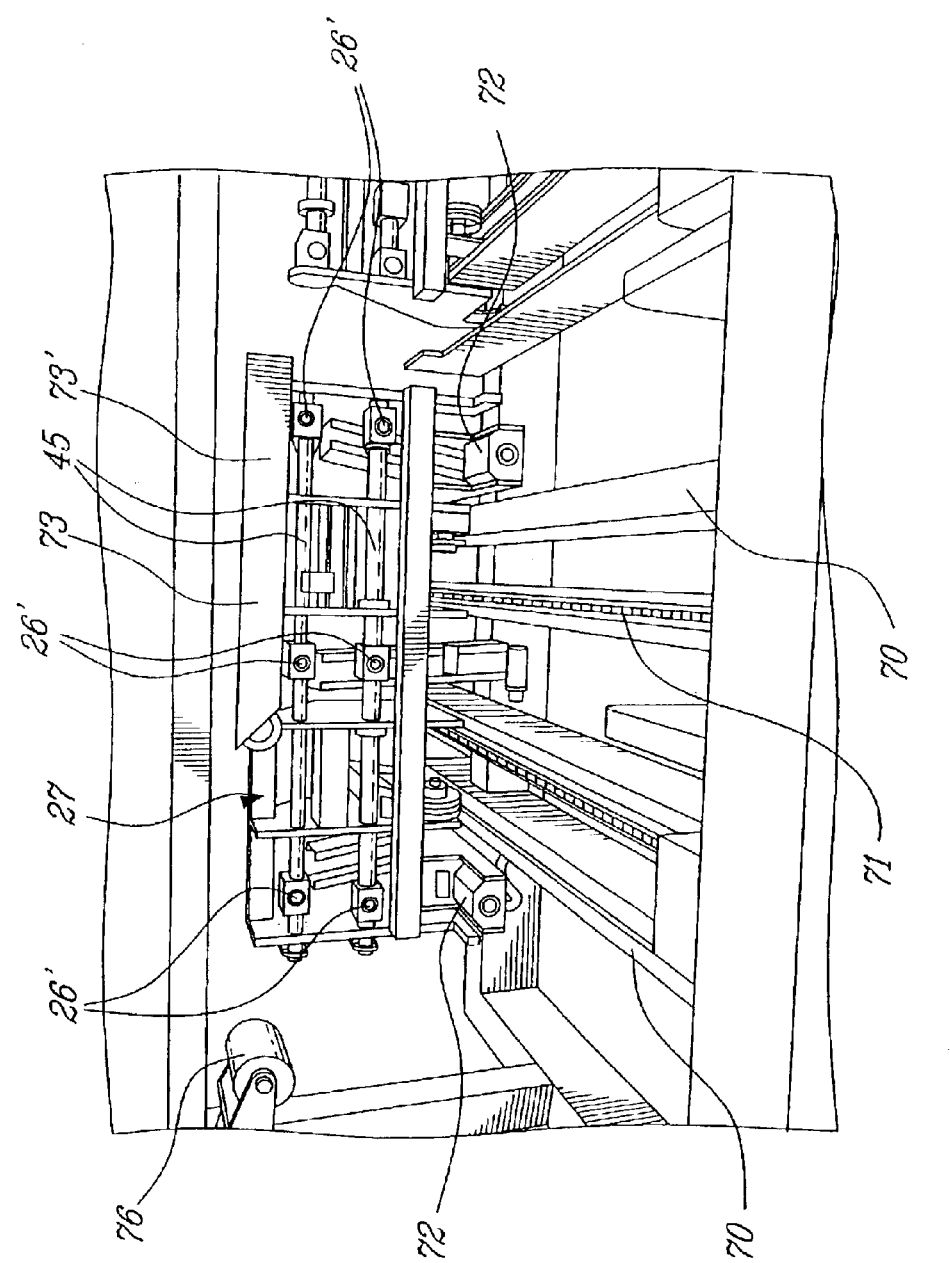
FIG. 10 is a simplified perspective view showing the construction of the carriage frame.
Figure 11:
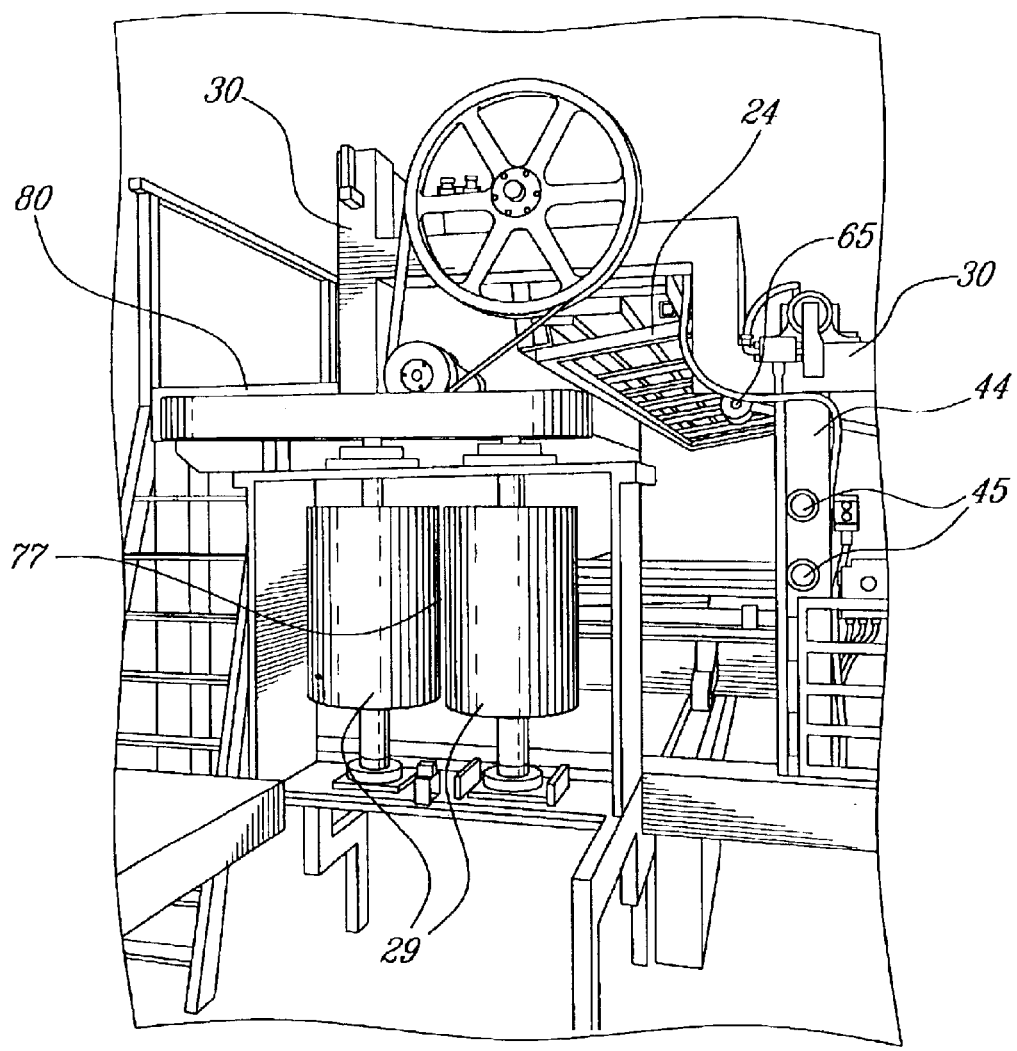
FIG. 11 is a simplified perspective end view of the machine showing the construction of the driven pressing rolls at the discharge position of the machine.

As shown in FIG. 10 the carriage frame comprises a pair of pivoting rods 45 to which are secured connector plate transfer members 26'. This carriage frame 57 positions the pivotal connector plate transfer members 26' from a connector plate engaging position 55 to a connector plate applying position at the fastening location 25 after the transfer platform 24 has been displaced to the fastening position. The connector plate transfer members 26' on the carriage frame 57 are in alignment with the connector plate transfer members 26 on the stationary frame 44 but are disposed on opposed sides of an assembled joist 10 to be positioned vertically at the fastening location 25 by the transfer platform 24 which will now be described in more detail with reference to FIGS. 8 and 11. As hereinshown the transfer platform 24 is constituted by a pivotal frame 60 having a support surface 61 constituted by a perforated surface to accommodate the attachment of the connector plates. Straight guide wall 62 sections provide abutment surfaces. The pivotal frame 60 is displaceable to an assembled wood piece receiving position 63, shown in FIG. 8, wherein the clamped wood pieces 11 and 13 of the inverted modular platform 22' are disposed in close parallel relationship. By releasing the clamping action of the clamping pistons in the modular platform 22' the wood pieces fall onto the flat support surface 61 of the transfer platform 24 and maintain their orientation. These wood pieces are then clamped by a suitable arrangement of pistons 64 to hold the assembled wood pieces in contact and non-obstructed at interconnecting junctions 14 and transfer the assembled wood pieces to the fastening location 25. The transfer platform 24 is secured to a pivot connection 25 and is displaceable by a suitable actuating means such as pistons or motor driven gears, whereby to displace the support platform from its horizontal loading position 63 to a vertical position adjacent the stationary frame 44 where the connecting plate transfer members 26 are at their connector plate applying positions. It is pointed out that in FIG. 8 the component parts are only shown to illustrate the basic assemblies and the schematic illustration does not coincide with the assembly as shown in FIG. 11. When the transfer platform 24 is displaced against the connector plate transfer members 26 secured to the stationary frame 44 there is sufficient force in the assembled frame striking the connector plates secured to the transfer member whereby the finger projections 16 of these plates partly enter into the surface of the wood piece at the end of connecting junctions.

As the transfer platform 24 is displaced to the fastening location 25 the carriage frame 57 is being drawn on its guide rails 70 by suitable drive means such as drive chain 71 whereby the connector plates of its connector plate transfer members 26' strike the opposed side of the joist 10' as shown in phantom lines in FIG. 8, whereby to cause the finger projections 16 thereof to also enter the opposed surface of the wood pieces whereby the joist is now assembled and held together by opposed connector plates at the end of connection junctions. Meanwhile, the transfer platform 24 is still in its vertical position at the fastening location 24 and the joist pieces held by the piston 64. The carriage frame 57 is provided with a pair of driveable support rolls 72 secured to its frame forwardly of the connector plate transfer rolls 26' and spaced a predetermined distance thereunder whereby to receive the bottom elongated wood piece 12 of the joist. The carriage frame is also provided with a top guide means 73 to capture the top elongated lumber piece 11 of the joist and hold the assembled joist vertically. The piston 24 of the transfer platform 24 are located on the top and bottom of the joist and are then retracted to permit the assembled joist to be pulled away by the carriage frame 57 to clear the fastening location 25. After it is cleared from that location, the transfer platform 24 then retracts to its horizontal loading position, as illustrated in FIG. 8.

The carriage frame 57 displaces the assembled structural wood joist to a discharge position 75, see FIG. 3, where a guide roller 76, secured to a pivotal linkage 77, is applied on the top elongated lumber piece 11 of the joist to hold the assembled joist in vertical position at the discharge location on the support rolls. As shown in FIG. 10 the guide means 73 is also provided with guide rails 73' which engage on opposed sides of the top elongated lumber piece 11 to maintain the assembled joist, with the connector plates partly embedded therein in a vertical position.

Once at the discharge location 75 the driveable support rolls 72 are actuated whereby to cause the joist to move into a pressing gap 77 defined between two driven pressing rolls 29 as better illustrated in FIGS. 3, 11 and 12. The pressing gap 77 is spaced the width of the assembled joist pieces whereby as the assembled joist is engaged by the rolls it discharges the assembled joist but at the same time the rolls firmly press the connector plates against the assembled wood pieces to cause the wood engaging finger projections of the connector plates to fully embed into the wood pieces at the interconnecting junctions thereof while at the same time discharging the assembled joist. Once the joist is discharged the carriage frame 57 moves back to its plate engaging position 55 and the connector plate transfer members 26 and 26' are actuated to pick-up connector plates and the cycle is repeated as soon as the modular platform 22 has been loaded by an operator person, standing on a platform surface 80 of the frame see FIG. 3, presses a switch to repeat the cycle. The operation of the various assemblies described are all automated and in sequence timing with one another once the operator has initiated the assembly cycle by depressing a switch.

Briefly summarizing the method of operation of the machine it is pointed out that an operator assembles wood pieces in orienting modules and at predetermined locations in the top modular platform 22 with the module dictating a predetermined structural wood component design. This design is set in the jig by assembling the modules and the length of the assembly. The assembled pre-cut wood pieces are then clamped by the operator operating a switch which starts the cycle. Meanwhile, the connector plate transfer members have picked up connector plates and located them at predetermined positions on opposed sides of the fastening location 25 when the joist was being discharged and when the jig was being reloaded. The transfer platform then displaces to the fastening location and the connecting plates are applied as above described and the assembled joist component pieces which are partly interconnected by the connector plates to hold the wood pieces together to form the structural wood joist is then engaged by the carriage and displaced to the discharge location where it is discharged through a pair of pressing rolls 29 and through a pressing gap 77 to firmly embed the plurality of wood engaging finger projections of each plate into opposed sides of the assembled wood pieces at their interconnecting junctions and the cycle again repeated.

It is within the ambit of the present invention to cover any obvious modifications of the embodiments described herein, provided such modifications fall within the scope of the appended claims.

What is claimed is:

1. A machine for fabricating structural wood components, said machine comprising a component assembling jig for assembling pre-cut wood pieces at predetermined positions corresponding to a structural wood component design, retaining means in said jig to retain said wood pieces positioned therein, connector plate storage means; connector plate positioning means adapted to position a plurality of connector plates at predetermined locations, with respect to said component design, at a fastening location; each said connector plates having a plurality of wood engaging finger projections extending from a flat surface of each said plates, displacement means for transferring said assembled wood pieces to a clamping transfer platform to hold said assembled wood pieces in contact at interconnecting junctions and transfer said clamped assembled wood pieces to said fastening location with said interconnecting junctions adjacent associated ones of said predetermined locations, means to secure said connector plates to said wood pieces at said interconnecting junctions to interconnect said wood pieces together to form an assembled structural wood component, and discharge means to discharge said assembled structural wood component.

2. A machine as claimed in claim 1 wherein said component assembling jig is a modular platform provided with removably securable wood piece orienting modules, said modules comprising end modules and intermediate modules, said modules having guide means to receive predetermined ones of said pre-cut wood pieces and orient them in conformity with said structural wood component design.

3. A machine as claimed in claim 2 wherein said retaining means are clamping piston cylinders associated with said guide means to clamp said pre-cut wood pieces positioned in said guide means.

4. A machine as claimed in claim 3 wherein said guide means comprises guide wall sections, said pre-cut wood pieces being immovably clamped against at least some of said guide walls by said clamping piston cylinders.

5. A machine as claimed in claim 3 wherein said displacement means is a pivotal frame to which said component assembling jig is secured, and frame displacement means to displace said component assembling jig about a pivot connection to position said wood pieces clamped in said component assembling jig over said clamping transfer platform, said assembled wood pieces being transferred to said transfer platform by deactivating said clamping piston cylinders.

6. A machine as claimed in claim 5 wherein said transfer platform is provided with clamping means to clamp said assembled wood pieces in contact with one another at said interconnecting junctions.

7. A machine as claimed in claim 5 wherein said component assembling jig comprises a displaceable slide section to displace at least an end portion of said modules to set the length of said structural component being assembled by said wood pieces in conformity with said component design.

8. A machine as claimed in claim 7 wherein said component assembling jig has two of said platforms, said platforms being elongated wood piece receiving platforms disposed in side-by-side offset and parallel relationship and secured to said pivotal frame, said platforms being inverted one with respect to the other, said pivot connection lying on an elongated axis extending co-extensively with a longitudinal axis of said platforms and disposed therebetween, one of said platforms facing upwardly at a loading position to receive wood pieces therein while the other faces downwardly at a transfer position to transfer said clamped assembled wood pieces onto said transfer platform.

9. A machine as claimed in claim 1 wherein said connector plate positioning means is constituted by a plurality of pivotal connector plate transfer members each pivotal from a plate engaging position over a discharge end of an associated plate storage magazine constituting said connector plate storage means, to a respective one of said predetermined locations at said fastening location.

10. A machine as claimed in claim 9 wherein each said connector plate transfer members has at least a magnetic transfer surface, said connector plates being magnetically attractable metal connector plates.

11. A machine as claimed in claim 10 wherein each said plate storage magazines has a guide trough for receiving a stack of connector plates, pusher means to displace said stack in said trough to position an uppermost one of said plates in said stack adjacent said discharge end of said storage magazine to be magnetically engaged by said magnetic transfer surface.

12. A machine as claimed in claim 11 wherein some of said connector plates are of different sizes, said plate storage magazines guide troughs being dimensioned to receive said connector plates, said magazines being pivotally mounted for displacement from a plate loading position to a plate feeding position.

13. A machine as claimed in claim 9 wherein some of said plurality of pivotal connector plate transfer members are secured to a stationary frame adjacent a transfer space delineated under said clamping transfer platform, and a carriage frame to which is secured corresponding one of said plurality of pivotal connector plate transfer members, said carriage frame displacing said plate transfer members from a connector plate engaging position to said fastening position after said transfer platform has positioned said clamped wood pieces at said fastening position, therebeing equal number of connector plates secured to said stationary frame and said carriage frame and disposed at said predetermined locations, said connector plates of said stationary frame being disposed on one side of said fastening position in a common plane while said connector plates secured to said carriage are disposed on an adjacent side in a common plane and aligned with associated like connector plates secured to said stationary frame; said carriage frame being displaced against said held joist components to cause said plurality of wood engaging finger projections of its connector plates, to engage in said joist components about said interconnecting junctions and interconnect them together; said carriage frame having engaging means to engage said structural wood component to transfer said component with interconnected wood pieces to an ejecting position away from said transfer space.

14. A machine as claimed in claim 13, wherein said plurality of wood engaging finger projections are only partly engaged in said wood pieces to immovably hold them together, therebeing further provided a pair of driven pressing rolls adjacent said ejecting position, said discharge means discharging said interconnected joist components through a pressing gap between said pressing rolls to firmly press said plates against said assembled structural component at said interconnecting junctions to cause said wood engaging finger projections to be fully embedded into said wood components at said interconnecting junctions.

15. A machine as claimed in claim 14, wherein said discharge means is constituted by a pair of drive rolls secured to a lower end of said carriage frame and supporting a lower elongated wood piece of said assembled structural wood component, and a top guide assembly guiding an upper elongated parallel wood piece of said assembled structural wood component in a vertical plane.

16. A machine as claimed in claim 15, wherein said driven pressing rolls also constitute said discharge means.

17. A machine as claimed in claim 13, herein said engaging means of said carriage frame is constituted by pistons engaging a top and a bottom wood piece of said assembled and interconnected wood pieces.

18. A machine as claimed in claim 1 wherein said structural wood component is a structural wood joist component.

19. A method of fabricating structural wood components comprising the steps of:
    i) disposing pre-cut wood pieces at predetermined positions in a component assembling jig,
    ii) clamping said pre-cut wood pieces in said component assembling jig;
    iii) positioning a plurality of connector plates at predetermined locations with respect to a wood piece fastening location;
    iv) displacing said clamped assembled wood pieces to a transfer position;
    v) transferring said assembled wood pieces on a transfer support platform by unclamping said wood pieces while maintaining their assembled orientation;
    vi) clamping said wood pieces on said transfer support platform to position said assembled wood pieces in contact at interconnecting junctions,
    vii) displacing said transfer support platform to said fastening location with said interconnecting junctions exposed and positioned adjacent associated connector plate positioning means aligned on opposed sides of said structural wood component formed by said assembled wood pieces,
    viii) pressing said connector plates against said assembled wood pieces from opposed sides of said interconnecting junctions to cause a plurality of wood engaging finger projections of said plates to penetrate into said assembled wood pieces about said interconnecting junctions, and
    ix) discharging said assembled structural wood component.

20. A method as claimed in claim 19 wherein prior to step (i) there is provided the step of assembling wood piece orienting modules at predetermined locations in said components assembling jig in conformity with a structural wood component design, therebeing end and intermediate wood piece orienting modules.

21. A method as claimed in claim 20 wherein there is further provided the step of adjusting the length of a module support section of said jig dependent on a desired length of said structural wood component design.

22. A method as claimed in claim 20 wherein said component assembling jig has two platforms to which said modules are connected to provide for assembly of two like structural wood components, said two platforms being secured to a pivot connection, therebeing provided in said step (iv) displacing said two platforms simultaneously from a loading position to a transfer position and from said transfer position to said loading position.

23. A method as claimed in claim 22 wherein said platforms are inverted when displaced to said transfer position, said step (v) comprising disabling clamping pistons at said transfer position to release said assembled wood pieces on said transfer platform.

24. A method as claimed in claim 19 wherein prior to step (vii) there is provided the steps of displacing said connector plate positioning means to a plate pick-up position to pick-up connector plates, and then to said plate fastening position.

25. A method as claimed in claim 24 wherein said connector plate positioning means are secured to a stationary frame on one of said opposed sides and to a displaceable carriage on an opposed side, said connector plate positioning means of said stationary frame and said carriage being aligned with one another, said step (viii) comprising causing engagement of said wood engaging finger projections of said connector plates of said positioning means secured to said stationary frame by said step (vii) wherein said assembled wood pieces are pressed against said finger projections by said transfer frame to partly penetrate in said wood pieces on one side of said clamped assembled wood pieces, and displacing said carriage towards the other side of said clamped assembled wood pieces to partly penetrate said finger projections of connector plates supported by said carriage in said wood pieces on the other side of said clamped assembled wood pieces.

26. A method as claimed in claim 25 wherein after said step (viii) there is provided the step of engaging said assembled wood pieces with said connector plate engaged thereto by said carriage and displacing said assembled wood pieces to an ejecting position to clear a loading space under said transfer position.

27. A method as claimed in claim 26 wherein when said assembled wood pieces reach said transfer position said step (iv) is initiated.

28. A method as claimed in claim 26 wherein said step of engaging comprises positioning a driveable support roll secured to a lower end of said carriage in supporting contact with a lower elongated wood piece of said assembled structural wood component, and a top guide assembly in guided engagement with an upper elongated parallel wood piece.

29. A method as claimed in claim 28 wherein there is provided a pair of driven pressing rolls defining a pressing gap therebetween, said pressing gap being aligned with said ejecting position, said step (ix) comprising displacing said assembled structural component into said pressing gap by activating said driveable support roll.

30. A method as claimed in claim 29 wherein said step (ix) further comprises fully embedding said wood engaging finger projections in said wood components at said interconnecting junctions by squeezing said plates on opposed sides of said assembled structural component when passing through said pressing gap of said driven pressing rolls, said pressing rolls also discharging said assembled structural component.

* * * * *